(12) United States Patent
Liu

(10) Patent No.: US 12,225,453 B2
(45) Date of Patent: Feb. 11, 2025

(54) SERVING CELL RAT ACQUISITION AND INDICATION METHODS AND APPARATUSES, AND DEVICES

(71) Applicant: SPREADTRUM COMMUNICATIONS (SHANGHAI) CO., LTD., Shanghai (CN)

(72) Inventor: Xing Liu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 386 days.

(21) Appl. No.: 17/793,821

(22) PCT Filed: Mar. 18, 2021

(86) PCT No.: PCT/CN2021/081446
§ 371 (c)(1),
(2) Date: Jul. 19, 2022

(87) PCT Pub. No.: WO2021/143956
PCT Pub. Date: Jul. 22, 2021

(65) Prior Publication Data
US 2023/0048247 A1 Feb. 16, 2023

(30) Foreign Application Priority Data
Jan. 19, 2020 (CN) .......................... 202010059729.1

(51) Int. Cl.
*H04W 48/16* (2009.01)
*H04W 8/08* (2009.01)
*H04W 76/20* (2018.01)

(52) U.S. Cl.
CPC ............. *H04W 48/16* (2013.01); *H04W 8/08* (2013.01); *H04W 76/20* (2018.02)

(58) Field of Classification Search
CPC ....... H04W 48/16; H04W 76/20; H04W 8/08; H04W 40/36; H04W 52/02; H04W 8/14;
(Continued)

(56) References Cited

U.S. PATENT DOCUMENTS

| 10,098,140 B2 | 10/2018 | Mallik et al. |
| 2010/0046428 A1 | 2/2010 | Lee et al. |

(Continued)

FOREIGN PATENT DOCUMENTS

| CN | 101873576 A | 10/2010 |
| CN | 102017707 A | 4/2011 |

(Continued)

OTHER PUBLICATIONS

International Search Report for International Application No. PCT/CN2021/081446; Date of Mailing, Jun. 23, 2021.

*Primary Examiner* — Mewale A Ambaye
(74) *Attorney, Agent, or Firm* — CANTOR COLBURN LLP

(57) ABSTRACT

A method and apparatus for acquiring a Radio Access Technology (RAT) of a serving cell, a method and apparatus for indicating a RAT of a serving cell, and devices are provided. The method for acquiring a RAT of a serving cell includes: receiving RAT indication information from the relay device, wherein the RAT indication information indicates RAT information of the serving cell where the relay device is located; determining, based on the RAT indication information, a RAT type adopted by a base station to which the serving cell belongs; and communicating with the base station using the RAT appropriate to the RAT type adopted by the base station.

15 Claims, 2 Drawing Sheets

(58) Field of Classification Search
CPC ..... H04W 24/02; H04W 48/10; H04W 88/06; H04W 76/14; H04W 76/15
See application file for complete search history.

(56) References Cited

U.S. PATENT DOCUMENTS

| | | | |
|---|---|---|---|
| 2016/0087877 A1* | 3/2016 | Ryu | H04L 45/22 |
| | | | 370/329 |
| 2016/0100347 A1 | 4/2016 | Ryu et al. | |
| 2019/0349821 A1 | 11/2019 | Kim | |
| 2020/0008127 A1* | 1/2020 | Ohtsuji | H04W 4/70 |
| 2020/0077460 A1 | 3/2020 | Hahn et al. | |
| 2020/0314819 A1* | 10/2020 | Loehr | H04W 4/40 |
| 2020/0351409 A1* | 11/2020 | Karampatsis | H04W 76/30 |
| 2021/0168698 A1* | 6/2021 | Fan | H04W 48/10 |
| 2021/0297999 A1* | 9/2021 | Kim | H04W 72/0453 |

FOREIGN PATENT DOCUMENTS

| | | |
|---|---|---|
| CN | 106716936 A | 5/2017 |
| CN | 106797602 A | 5/2017 |
| CN | 109076450 A | 12/2018 |
| CN | 109729564 A | 5/2019 |
| CN | 111277994 A | 6/2020 |

* cited by examiner

SERVING CELL RAT ACQUISITION AND INDICATION METHODS AND APPARATUSES, AND DEVICES

CROSS-REFERENCE TO RELATED APPLICATIONS

This is the U.S. national stage of application No. PCT/CN2021/081446, filed on Mar. 18, 2021. Priority under 35 U.S.C. § 119(a) and 35 U.S.C. § 365(b) is claimed from Chinese Application No. 202010059729.1, filed Jan. 19, 2020, the disclosure of which is also incorporated herein by reference.

TECHNICAL FIELD

The present disclosure generally relates to communication field, and more particularly, to a method and apparatus for acquiring a Radio Access Technology (RAT) of a serving cell, a method and apparatus for indicating a RAF of a serving cell, and devices.

BACKGROUND

To enlarge a coverage of transmission, a relay is introduced between a sender and a receiver to forward data received from a base station, thereby enlarging a coverage of the base station.

Generally, when a User Equipment (UE) communicates with a base station via a relay device, the UE needs to know a Radio Access Technology (RAT) adopted by the base station.

When object direct connection communication technology is adopted between the relay device and the UE, and traditional uplink and downlink communication technology is adopted between the relay device and a network device, especially after introduction of new sidelink technology, the standard not only supports connection between the relay device and a Long Term Evolution (LTE) network, but also supports connection between the relay device and a New Radio (NR) network. That is, the relay device can use LTE radio access technology or NR radio access technology to access the base station.

SUMMARY

With the embodiments of the present disclosure, a UE is able to determine a RAT for communicating with a base station, when there are multiple RATs available for communication with the base station.

In an embodiment of the present disclosure, a method for acquiring a RAT of a serving cell where a relay device is located is provided, including: receiving RAT indication information from the relay device, wherein the RAT indication information indicates RAT information of the serving cell where the relay device is located; determining, based on the RAT indication information, a RAT type adopted by a base station to which the serving cell belongs; and communicating with the base station using the RAT appropriate to the RAT type adopted by the base station.

In an embodiment of the present disclosure, a method for indicating a RAT of a serving cell where a relay device is located is provided, including: acquiring RAT information of the serving cell where the relay device is located; and sending RAT indication information which indicates the RAT information of the serving cell, so that a UE determines, based on the RAT indication information, a RAT type adopted by a base station to which the serving cell belongs, and communicates with the base station using the RAT appropriate to the RAT type adopted by the base station.

In an embodiment of the present disclosure, a UE including a memory and a processor is provided, wherein the memory has computer instructions stored therein, and when the processor executes the computer instructions, the above method for acquiring the RAT of the serving cell where the relay device is located is performed.

In an embodiment of the present disclosure, a relay device including a memory and a processor is provided, wherein the memory has computer instructions stored therein, and when the processor executes the computer instructions, the above method for indicating the RAT of the serving cell where the relay device is located is performed.

In an embodiment of the present disclosure, a non-volatile or non-transitory computer-readable storage medium having computer instructions stored therein is provided, wherein when the computer instructions are executed by a processor, the above method for acquiring the RAT of the serving cell where the relay device is located or the above method for indicating the RAT of the serving cell where the relay device is located is performed.

DETAILED DESCRIPTION

Figure 1:
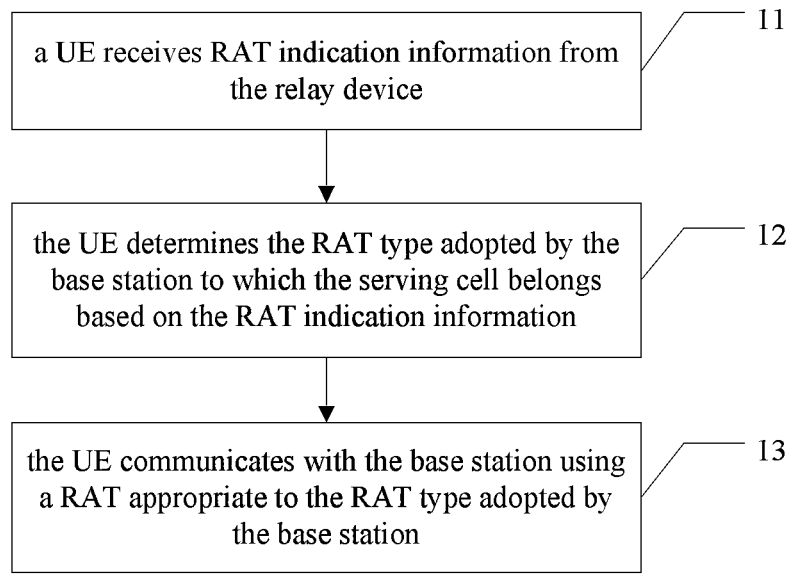
FIG. 1 is a flow chart of a method for acquiring a RAT of a serving cell where a relay device is located according to an embodiment.

Device-to-device communication technology or sidelink communication technology differs from ordinary wireless cellular network communication technology. In a traditional cellular network, a UE and a base station communicate with each other, where a link between the UE and the base station is called uplink or downlink, and an interface is called Uu interface. In the sidelink communication, a UE communicates directly with another UE, where a link between the UEs is called a Sidelink (SL), and an interface is called PC5 interface.

Relay is a coverage enhancement technology. A relay can forward data received from a base station to enlarge a coverage of the base station. In an LTE network, a radio communication technology used between a relay device and a UE is the same as that used between a relay device and a base station. For UE, the relay device is like a base station. When a UE detects a synchronization signal or a broadcast signal of the relay device, it can know a RAT adopted by the relay device, and accordingly can know a RAT adopted by the base station, so that the UE can use a corresponding RAT to communicate with the base station.

In 3GPP Rel-13 release, a new relay technology was introduced. In this new relay technology, the sidelink communication technology is adopted between a relay device and a terminal device, and the traditional uplink and downlink communication technology is adopted between the relay device and a network device. In this case, a RAT adopted by the network device cannot be known from a synchronization signal, a broadcast signal and a discovery signal sent by the relay device. However, as the standard only supports the relay device connecting with a 4G (LTE) network, the UE considers that an available relay device is definitely connected to an LTE base station, i.e., an Evolved Node B (eNB).

In 3GPP Rel-16, a new sidelink technology was introduced. Besides, a relay technology based on this new sidelink technology will be supported in 3GPP Rel-17. However, the standard should not only support the relay device being connected to the LTE network, but also support a connection to a 5G (NR) network. However, only by receiving existing information of the relay device, it is impossible to know the RAT between the relay device and the base station. As a result, the UE cannot determine which RAT to be used for communication with the base station.

In embodiments of the present disclosure, the UE determines the RAT type adopted by the base station to which the serving cell where the relay device is located belongs based on the RAT indication information from the relay device, so that the RAT appropriate to the RAT type adopted by the base station can be used for communication with the base station to which the serving cell where the relay device is located belongs.

In order to clarify the objects, characteristics and advantages of the disclosure, embodiments of present disclosure will be described in detail in conjunction with accompanying drawings.

FIG. 1 is a flow chart of a method for acquiring a RAT of a serving cell where a relay device is located according to an embodiment. Referring to FIG. 1, the method includes 11, 12 and 13.

In 11, a UE receives RAT indication information from the relay device.

In some embodiments, when the relay device is set between the UE and a base station, the relay device may send RAT indication information, wherein the RAT indication information indicates RAT information of the serving cell where the relay device is located. If being within a signal coverage of the relay device, the UE can receive the RAT indication information sent by the relay device.

In some embodiments, the UE may acquire the RAT indication information from various types of information.

In some embodiments, the UE may acquire the RAT indication information from sidelink system information, that is, the RAT indication information is included in the sidelink system information. The sidelink system information can be encapsulated as a Sidelink Master Information Block (SL-MIB), or a Sidelink System Information Block (SL-SIB). The relay device can periodically send SL-MIB or SL-SIB. When the RAT indication information is included in the sidelink system information and is encapsulated as an SL-MIB, the UE can acquire the RAT indication information from the received SL-MIB. When the RAT indication information is included in the sidelink system information and is encapsulated as an SL-SIB, the UE can acquire the RAT indication information from the received SL-SIB.

In some embodiments, the UE may acquire the RAT indication information from discovery message, that is, the RAT indication information is included in the discovery message. The discovery message is used for the UE to discover the relay device, or for the relay device to discover the UE. The UE may acquire the RAT indication information from the received discovery message.

In some embodiments, the UE may acquire the RAT indication information from Sidelink Radio Resource Control (SL-RRC) signaling, that is, the RAT indication information is included in the SL-RRC signaling, or the RAT information of the serving cell is included in the SL-RRC signaling. The SL-RRC signaling may be SL-RRC signaling in a process of establishing a sidelink, such as a sidelink RRC connection establishment message, or SL-RRC signaling after a sidelink is established, such as a sidelink RRC connection reconfiguration message. After receiving the SL-RRC signaling, the UE may acquire the RAT indication information from the SL-RRC signaling.

In some embodiments, the UE may acquire the RAT indication information from the system information of the base station sent by the relay device, that is, the RAT indication information is included in the system information of the base station. The relay device can forward the system information of the base station, and the UE can acquire the system information of the base station and further acquire the RAT information of the serving cell where the relay device is located based on the system information of the base station. The system information of the base station can be encapsulated as a Master Information Block (MIB) or a System Information Block (SIB).

In 12, the UE determines the RAT type adopted by the base station to which the serving cell belongs based on the RAT indication information.

For example, if the RAT indication information indicates that the serving cell where the relay device is located is an LTE cell, the RAT type adopted by the base station to which the serving cell belongs is LTE, that is, the base station to which the serving cell where the relay device is located belongs can provide LTE service. For another example, if the RAT indication information indicates that the serving cell where the relay device is located is an NR cell, the RAT type adopted by the base station to which the serving cell belongs is NR, that is, the base station to which the serving cell where the relay device is located belongs can provide NR service.

In some embodiments, when the RAT indication information is included in the system information of the base station, the UE may determine the RAT type adopted by the base station to which the serving cell belongs based on content of the system information of the base station. For example, when the relay device forwards the system information of the base station, the system information of the base station carries the RAT indication information. For another example, the system information of the base station does not carry the RAT indication information, and the relay device adds the RAT information of the base station to the system information of the base station before forwarding.

In some embodiments, as the system information of LTE and the system information of NR are different in size (such as a number of occupied bits), the UE may determine the RAT type adopted by the base station to which the serving cell belongs based on the size of the system information of the base station.

In some embodiments, based on determining the RAT type adopted by the base station based on the size of the system information of the base station, the UE may compare the received system information of the base station with various types of preset standard system information, determine the RAT type of the serving cell based on a comparison result, and determine the RAT type adopted by the base station based on the RAT type of the serving cell.

In some embodiments, the system information of the base station is encapsulated as MIB, and the various types of standard system information include standard LTE MIB and standard NR MIB. The UE may compare the MIB of the base station received from the relay device with the standard LTE MIB and the standard NR MIB, respectively. In response to the MIB of the base station being the same as the standard LTE MIB in size, it is determined that the serving cell is an LTE cell. In response to the MIB of the base station being the same as the standard NR MIB in size, it is determined that the serving cell is an NR cell.

In some embodiments, the system information of the base station is encapsulated as SIB, and the various types of standard system information include standard LTE SIB and standard NR SIB. The UE may compare the SIB of the base station received from the relay device with the standard LTE SIB and the standard NR SIB, respectively. In response to the SIB of the base station being the same as the standard LTE SIB in size, it is determined that the serving cell is an LTE cell. In response to the SIB of the base station being the same as the standard NR SIB in size, it is determined that the serving cell is an NR cell.

It could be understood that communication systems used between the base station and the relay device, and between the base station and the UE are not limited to the above-mentioned 5G communication systems and 4G communication systems, but can also be applied to existing 3G communication systems and various new communication systems in the future, such as 6G or 7G communication systems. Depending on different types of communication systems used, RAT types adopted by the base station are also different. The communication technology used between the relay device and the UE is not limited to the above-mentioned sidelink technology or device-to-device communication technology, and can also be 3G, 4G, 5G, 6G, 7G and so on.

In 13, the UE communicates with the base station using the RAT appropriate to the RAT type adopted by the base station.

In some embodiments, after determining the RAT type adopted by the base station, the UE may use the RAT appropriate to the base station to communicate with the base station.

In some embodiments, the UE uses a RAT of the same type as the RAT of the base station to communicate with the base station.

For example, based on the base station using the LTE RAT in the serving cell where the relay device is located, the UE uses the LTE RAT to communicate with the base station.

For another example, based on the base station using the NR RAT in the serving cell where the relay device is located, the UE uses the NR RAT to communicate with the base station.

In some embodiments, the UE communicates with the base station using a RAT that is different from but is appropriate to and compatible with the RAT type of the base station.

From above, the relay device sends the indication information for indicating the RAT information of the serving cell where the relay device is located, and the UE determines the RAT type adopted by the base station to which the serving cell where the relay device is located belongs based on the RAT indication information sent by the relay device, so as to use the RAT appropriate to the RAT type adopted by the base station communicate with the base station to which the serving cell of the relay device belongs.

Figure 2:
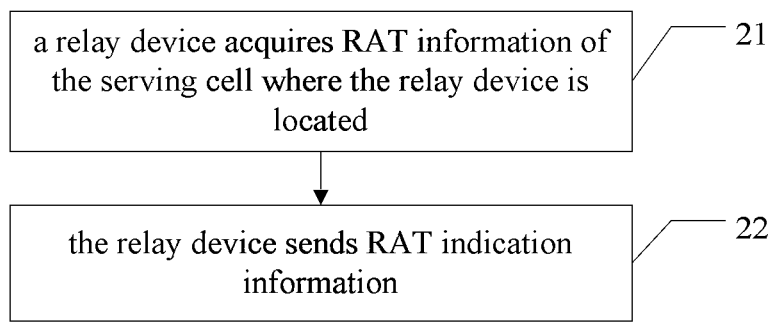
FIG. 2 is a flow chart of a method for indicating a RAT of a serving cell where a relay device is located according to an embodiment.

FIG. 2 is a flow chart of a method for indicating a RAT of a serving cell where a relay device is located according to an embodiment. Referring to FIG. 2, the method includes 21 and 22.

In 21, a relay device acquires RAT information of the serving cell where the relay device is located.

In some embodiments, when the relay device accesses a base station, it can acquire the RAT information of the serving cell where the relay device is located through a synchronization signal, a broadcast signal and so on sent by the base station, that is, acquire the RAT adopted by the base station in communication.

In 22, the relay device sends RAT indication information.

In some embodiments, the RAT indication information is used to indicate the RAT information of the serving cell of the relay device. The relay device may send the RAT indication information in various ways.

In some embodiments, the RAT indication information is included in any kind of information, such as sidelink system information, discovery message or SL-RRC signaling, to be sent.

For example, the RAT indication information is included in the sidelink system information which is encapsulated into SL-MIB or SL-SIB. The relay device sends the SL-MIB or SL-SIB periodically. Based on the RAT indication information being included in the SL-MIB, the UE may acquire the RAT indication information from the received SL-MIB within a signal coverage of the relay device. Based on the RAT indication information being included in the SL-SIB, the UE may acquire the RAT indication information from the received SL-SIB within the signal coverage of the relay device.

For another example, the discovery message includes the RAT indication information.

For another example, the RAT indication information is included in an SL-RRC signaling. The relay device may send the SL-RRC signaling including the RAT indication information to the UE during a process of establishing a connection with the UE. Alternatively, the relay device may send the RAT indication information in the SL-RRC signaling after a sidelink is established, for example, sending the RAT indication information in the sidelink RRC connection reconfiguration message.

In some embodiments, the RAT indication information is included in system information of the base station, and the relay device forwards the system information of the base station.

The system information of the base station may be encapsulated as MIB or SIB. There is multiple SIB information, numbered from 1, such as SIB1, SIB2, SIB3, etc.

For example, the relay device forwards the MIB of the base station, and the UE compares a size of the MIB received from the relay device and forwarded by the base station with an LTE MIB and an NR MIB, respectively. If the MIB of the base station is the same as the LTE MIB in size, it is determined that the serving cell where the relay device is located is an LTE cell. If the MIB of the base station is the same as the NR MIB in size, it is determined that the serving cell where the relay device is located is an NR cell.

For another example, the relay device forwards the SIB1 of the base station, and the UE compares a size of the SIB1 received from the relay device and forwarded by the base station with an LTE SIB1 and an NR SIB1, respectively. If the SIB1 of the base station is the same as the LTE SIB1 in size, it is determined that the serving cell where the relay device is located is an LTE cell. If the SIB1 of the base station is the same as the NR SIB1 in size, it is determined that the serving cell where the relay device is located is an NR cell.

For another example, the UE may determine the RAT type adopted by the base station in the serving cell where the relay device is located based on content of the system information of the base station.

In some embodiments, the relay device may directly forward the system information of the base station, or modify the system information of the base station and then send the modified system information. The modified system information may specify different RAT types by content or size. For example, when the relay device forwards the system information of the base station, the system information of the base station carries the RAT indication information. For another example, the system information of the base station does not carry the RAT indication information, and the relay device adds the RAT information of the base station to the system information of the base station before forwarding.

In some embodiments, after determining the RAT type adopted by the base station to which the serving cell belongs based on the RAT indication information, the UE may use a RAT appropriate to the RAT type adopted by the base station to communicate with the base station.

From above, the relay device indicates the RAT of the serving cell where the relay device is located by sending the RAT indication information, so that the UE within the signal coverage of the relay device can receive the RAT indication information, acquire, based on the RAT indication information, the RAT type of the base station to which the serving cell where the relay device is located belongs, and use the RAT appropriate to the RAT type of the base station to communicate with the base station.

Figure 3:
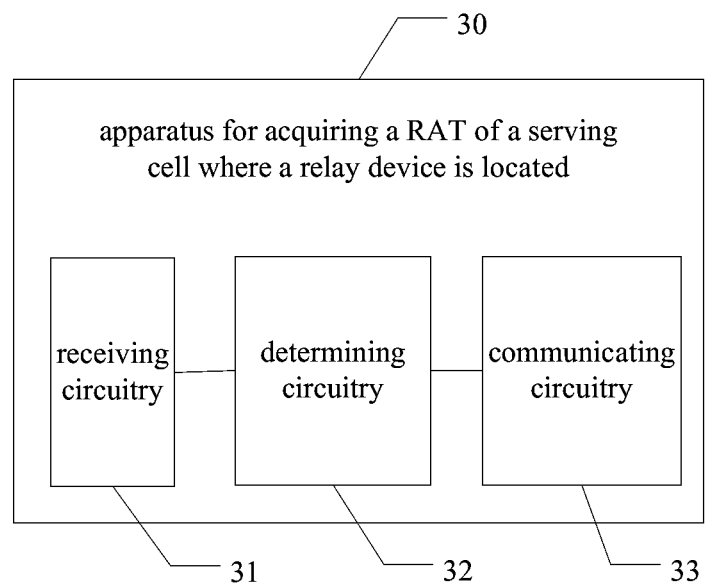
FIG. 3 is a structural diagram of an apparatus for acquiring a RAT of a serving cell where a relay device is located according to an embodiment.

In an embodiment of the present disclosure, an apparatus for acquiring a RAT of a serving cell where a relay device is located is provided. FIG. 3 is a structural diagram of an apparatus for acquiring a RAT of a serving cell where a relay device is located according to an embodiment. Referring to FIG. 3, the apparatus 30 includes a receiving circuitry 31, a determining circuitry 32 and a communicating circuitry 33.

The receiving circuitry 31 is configured to receive RAT indication information from the relay device, wherein the RAT indication information indicates RAT information of the serving cell where the relay device is located.

The determining circuitry 32 is configured to determine, based on the RAT indication information, a RAT type adopted by a base station to which the serving cell belongs.

The communicating circuitry 33 is configured to communicate with the base station using the RAT appropriate to the RAT type adopted by the base station.

More details on working principles and working flows of the apparatus 30 may be referred to relevant descriptions of the method for acquiring the RAT of the serving cell where the relay device is located provided in any of the above embodiments, which are not repeated here.

In some embodiments, the apparatus 30 may correspond to a chip with a function of acquiring the RAT of the serving cell in a terminal (also called UE) or a relay device, or a chip with a data processing function, such as a baseband chip, or a chip module in a UE having a chip with a function of acquiring the RAT of the serving cell where the relay device is located, or a chip module having a chip with a data processing function, or a UE.

Figure 4:
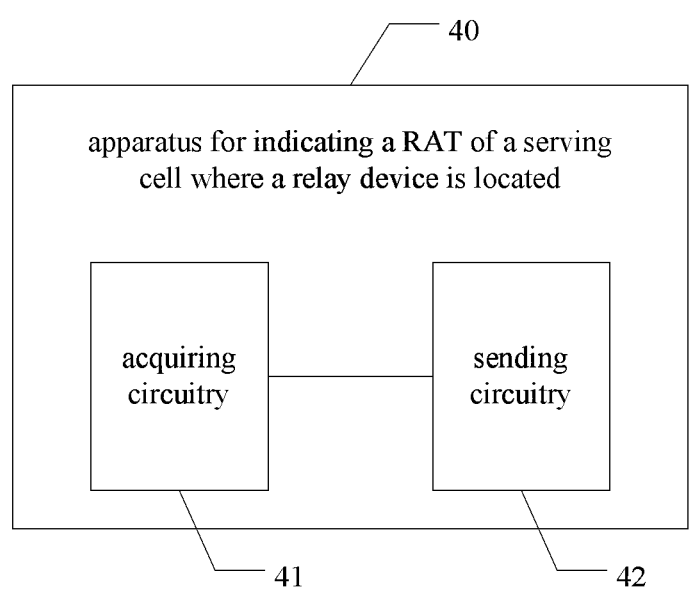
FIG. 4 is a structural diagram of an apparatus for indicating a RAT of a serving cell where a relay device is located according to an embodiment.

In an embodiment of the present disclosure, an apparatus for indicating a RAT of a serving cell where a relay device is located is provided. FIG. 4 is a structural diagram of an apparatus for indicating a RAT of a serving cell where a relay device is located according to an embodiment. Referring to FIG. 4, the apparatus 40 includes an acquiring circuitry 41 and a sending circuitry 42.

The acquiring circuitry 41 is configured to acquire RAT information of the serving cell where the relay device is located.

The sending circuitry 42 is configured to send RAT indication information which indicates the RAT information of the serving cell, so that a UE determines, based on the RAT indication information, a RAT type adopted by a base station to which the serving cell belongs, and communicates with the base station using the RAT appropriate to the RAT type adopted by the base station.

More details on working principles and working flows of the apparatus 40 may be referred to relevant descriptions of the method for indicating the RAT of the serving cell where the relay device is located provided in any of the above embodiments, which are not repeated here.

In some embodiments, the apparatus 40 may correspond to a chip with a function of acquiring the RAT of the serving cell in a terminal (also called UE) or a relay device, or a chip with a data processing function, such as a baseband chip, or a chip module in a UE having a chip with a function of acquiring the RAT of the serving cell where the relay device is located, or a chip module having a chip with a data processing function, or a UE.

In some embodiments, modules/units included in each apparatus and product described in the above embodiments may be software modules/units, hardware modules/units, or a combination of software modules/units and hardware modules/units.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a UE including a memory and a processor is provided, wherein the memory has computer instructions stored therein, and when the processor executes the computer instructions, the above method for acquiring the RAT of the serving cell where the relay device is located is performed.

In an embodiment of the present disclosure, a relay device including a memory and a processor is provided, wherein the memory has computer instructions stored therein, and when the processor executes the computer instructions, the above method for indicating the RAT of the serving cell where the relay device is located is performed.

In an embodiment of the present disclosure, a non-volatile or non-transitory computer-readable storage medium having computer instructions stored therein is provided, wherein when the computer instructions are executed by a processor, the above method for acquiring the RAT of the serving cell where the relay device is located or the above method for indicating the RAT of the serving cell where the relay device is located is performed.

Those skilled in the art could understand that all or part of steps in the various methods in the above embodiments can be completed by instructing relevant hardware through a program, and the program can be stored in any computer-readable storage medium which includes a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for acquiring a Radio Access Technology (RAT) of a serving cell where a relay device is located, comprising:
   receiving RAT indication information from the relay device, wherein the RAT indication information indicates RAT information of the serving cell where the relay device is located;
   determining, based on the RAT indication information, a RAT type adopted by a base station to which the serving cell belongs; and
   communicating with the base station using the RAT appropriate to the RAT type adopted by the base station;
   wherein said determining, based on the RAT indication information, the RAT type adopted by the base station to which the serving cell belongs:
      comparing system information of the base station with various types of preset standard system information to obtain a comparison result, and determining the RAT type of the serving cell based on the comparison result; and
      determining the RAT type adopted by the base station based on the RAT type of the serving cell.

2. The method according to claim 1, wherein the RAT indication information is included in any of following information:
   direct link system information, discovery message, and Sidelink Radio Resource Control (SL-RRC) signaling, wherein the direct link system information comprises Sidelink Master Information Block (SL-MIB) or Sidelink System Information Block (SL-SIB).

3. The method according to claim 1, wherein the RAT indication information is included in the system information of the base station.

4. The method according to claim 3, wherein said determining, based on the RAT indication information, the RAT type adopted by the base station to which the serving cell belongs further comprises:
   determining, based on content of the system information of the base station, the RAT type adopted by the base station to which the serving cell belongs.

5. The method according to claim 1, wherein said comparing the system information of the base station with various types of preset standard system information to obtain the comparison result, and determining the RAT type of the serving cell based on the comparison result comprises any of following:
   the various types of standard system information comprising standard Long Term Evolution (LTE) MIB and standard New Radio (NR) MIB, the system information of the base station being encapsulated as MIB, comparing the MIB of the base station with the standard LTE MIB and the standard NR MIB, respectively, determining that the serving cell is an LTE cell based on a size of the MIB of the base station being the same as that of the standard LTE MIB, and determining that the serving cell is an NR cell based on the size of the MIB of the base station being the same as that of the standard NR MIB; or
   the various types of standard system information comprising standard LTE SIB and standard NR SIB, the system information of the base station being encapsulated as SIB, comparing the SIB of the base station with the standard LTE SIB and the standard NR SIB, respectively, determining that the serving cell is an LTE cell based on a size of the SIB of the base station being the same as that of the standard LTE SIB, and determining that the serving cell is an NR cell based on the size of the SIB of the base station being the same as that of the standard NR SIB.

6. A method for indicating a Radio Access Technology (RAT) of a serving cell where a relay device is located, comprising:
   acquiring RAT information of the serving cell where the relay device is located; and
   sending RAT indication information which indicates the RAT information of the serving cell, so that a User Equipment (UE) determines, based on the RAT indication information, a RAT type adopted by a base station to which the serving cell belongs, and communicates with the base station using the RAT appropriate to the RAT type adopted by the base station;
   wherein said determining, based on the RAT indication information, the RAT type adopted by the base station to which the serving cell belongs:
      comparing system information of the base station with various types of preset standard system information to obtain a comparison result, and determining the RAT type of the serving cell based on the comparison result; and
      determining the RAT type adopted by the base station based on the RAT type of the serving cell.

7. The method according to claim 6, wherein said sending RAT indication information comprises any of following:
   including the RAT indication information in direct link system information, encapsulating the direct link system information into Sidelink Master Information Block (SL-MIB) or Sidelink System Information Block (SL-SIB), and sending the SL-MIB or SL-SIB;
   including the RAT indication information in a discovery message, and sending the discovery message;
   including the RAT indication information in Sidelink Radio Resource Control (SL-RRC) signaling, and sending the SL-RCC signaling; or
   including the RAT indication information in system information of the base station, and sending the system information.

8. A User Equipment (UE) comprising a memory and a processor, wherein the memory stores one or more programs, the one or more programs comprising computer instructions, which, when executed by the processor, cause the processor to perform the method of claim 1.

9. A relay device comprising a memory and a processor, wherein the memory stores one or more programs, the one or more programs comprising computer instructions, which, when executed by the processor, cause the processor to perform the method of claim 6.

10. A non-volatile or non-transitory computer-readable storage medium storing one or more programs, the one or more programs comprising computer instructions, which, when executed by a processor, cause the processor to:
   receive Radio Access Technology (RAT) indication information from a relay device, wherein the RAT indication information indicates RAT information of a serving cell where the relay device is located;
   determine, based on the RAT indication information, a RAT type adopted by a base station to which the serving cell belongs; and
   communicate with the base station using the RAT appropriate to the RAT type adopted by the base station;
   wherein said determining, based on the RAT indication information, the RAT type adopted by the base station to which the serving cell belongs:
      comparing system information of the base station with various types of preset standard system information to obtain a comparison result, and determining the RAT type of the serving cell based on the comparison result; and
      determining the RAT type adopted by the base station based on the RAT type of the serving cell.

11. The non-volatile or non-transitory computer-readable storage medium according to claim 10, wherein the RAT indication information is included in any of following information:
   direct link system information, discovery message, and Sidelink Radio Resource Control (SL-RRC) signaling, wherein the direct link system information comprises Sidelink Master Information Block (SL-MIB) or Sidelink System Information Block (SL-SIB).

12. The non-volatile or non-transitory computer-readable storage medium according to claim 10, wherein the RAT indication information is included in the system information of the base station.

13. The non-volatile or non-transitory computer-readable storage medium according to claim 12, wherein said determining, based on the RAT indication information, the RAT type adopted by the base station to which the serving cell belongs further comprises:
   determining, based on content of the system information of the base station, the RAT type adopted by the base station to which the serving cell belongs.

14. The non-volatile or non-transitory computer-readable storage medium according to claim 10, wherein said comparing the system information of the base station with various types of preset standard system information to obtain the comparison result, and determining the RAT type of the serving cell based on the comparison result comprises any of following:
   the various types of standard system information comprising standard Long Term Evolution (LTE) MIB and standard New Radio (NR) MIB, the system information of the base station being encapsulated as MIB, comparing the MIB of the base station with the standard LTE MIB and the standard NR MIB, respectively, determining that the serving cell is an LTE cell based on a size of the MIB of the base station being the same as that of the standard LTE MIB, and determining that the serving cell is an NR cell based on the size of the MIB of the base station being the same as that of the standard NR MIB; or
   the various types of standard system information comprising standard LTE SIB and standard NR SIB, the system information of the base station being encapsulated as SIB, comparing the SIB of the base station with the standard LTE SIB and the standard NR SIB, respectively, determining that the serving cell is an LTE cell based on a size of the SIB of the base station being the same as that of the standard LTE SIB, and determining that the serving cell is an NR cell based on the size of the SIB of the base station being the same as that of the standard NR SIB.

15. A non-volatile or non-transitory computer-readable storage medium storing one or more programs, the one or more programs comprising computer instructions, which, when executed by a processor, cause the processor to:
   acquiring RAT information of the serving cell where the relay device is located; and
   sending RAT indication information which indicates the RAT information of the serving cell, so that a User Equipment (UE) determines, based on the RAT indication information, a RAT type adopted by a base station to which the serving cell belongs, and communicates with the base station using the RAT appropriate to the RAT type adopted by the base station;
   wherein said determining, based on the RAT indication information, the RAT type adopted by the base station to which the serving cell belongs:
      comparing system information of the base station with various types of preset standard system information to obtain a comparison result, and determining the RAT type of the serving cell based on the comparison result; and
      determining the RAT type adopted by the base station based on the RAT type of the serving cell.

* * * * *